(12) United States Patent
Brown

(10) Patent No.: US 9,002,081 B2
(45) Date of Patent: Apr. 7, 2015

(54) COMPUTER-AIDED BONE SCAN ASSESSMENT WITH AUTOMATED LESION DETECTION AND QUANTITATIVE ASSESSMENT OF BONE DISEASE BURDEN CHANGES

(71) Applicant: Matthew Sherman Brown, Marina del Rey, CA (US)

(72) Inventor: Matthew Sherman Brown, Marina del Rey, CA (US)

( * ) Notice: Subject to any disclaimer, the term of this patent is extended or adjusted under 35 U.S.C. 154(b) by 150 days.

(21) Appl. No.: 13/652,654

(22) Filed: Oct. 16, 2012

(65) Prior Publication Data

US 2014/0105471 A1   Apr. 17, 2014

Related U.S. Application Data

(60) Provisional application No. 61/548,498, filed on Oct. 18, 2011, provisional application No. 61/714,318, filed on Oct. 16, 2012.

(51) Int. Cl.
  *G06T 7/00* (2006.01)
(52) U.S. Cl.
  CPC ..... *G06T 7/0014* (2013.01); *G06T 2207/30008* (2013.01); *G06T 7/0081* (2013.01); *G06T 2207/10128* (2013.01); *G06T 2207/20148* (2013.01); *G06T 2207/30096* (2013.01)
(58) Field of Classification Search
  CPC .............................................. G06T 2207/20128
  See application file for complete search history.

(56) References Cited

U.S. PATENT DOCUMENTS

| 2006/0242146 A1* | 10/2006 | Piacsek et al. ..................... 707/7 |
| 2007/0019849 A1* | 1/2007 | Kaufman et al. ............. 382/128 |
| 2008/0298657 A1* | 12/2008 | Shiraishi et al. ............. 382/130 |
| 2011/0087110 A1* | 4/2011 | Nathan et al. ................. 600/476 |

FOREIGN PATENT DOCUMENTS

| JP | 2004508118 A | 3/2004 |
| JP | 2006512938 A | 4/2006 |
| JP | 2009515594 A | 4/2009 |

OTHER PUBLICATIONS

Ohlsson et al., "Automated decision support for bone scintigraphy", 22nd IEEE International Symposium on CBMS 2009.*
Sadik et al., "Computer-assisted interpretation of planar whole-body bone scans", The Journal of Nuclear Medicine, vol. 49, No. 12, Dec. 2008.*
Jeong et al., "Comparison of image enhancement methods for the effective diagnosis in successive whole-body bone scans", Journal of Digital Imaging, vol. 24, No. 3, pp. 424-436, Jun. 2011.*
Huang et al., "A set of image processing algorithms for computer-aided diagnosis in nuclear medicine whole body bone scan images", IEEE Transactions on Nuclear Science, vol. 54, issue 3, Jun. 2007.*
Morris MJ et al., Post-treatment serial bone scan index (BSI) as an outcome measure predicting for survival., American Society of Clinical Oncology, 2008 Genitourinary Cancers Symposium, pp. 1-3.

(Continued)

*Primary Examiner* — Anand Bhatnagar
*Assistant Examiner* — Soo Park

(57) ABSTRACT

A computer aided bone scan assessment system and method provide automated lesion detection and quantitative assessment of bone disease burden changes.

26 Claims, 8 Drawing Sheets

(56) References Cited

OTHER PUBLICATIONS

May Sadik et al., A new computer-based decision-support system for the interpretation of bone scans, Nuclear Medicine Communications, 2006; vol. 27, No. 5, pp. 417-423.
Tang-Kai Yin et al., A Computer Aided Diagnosis for Locating Abnormalities in Bone Scintigraphy by a Fuzzy System With a Three-Step Minimization Approach, IEEE Transactions on Medical Imaging, vol. 23, No. 5, May 2004, pp. 639-654.
Yusuf E. Erdi et al., Quantitative Bone Metastases Analysis Based on Image Segmentation, The Journal of Nuclear Medicine, vol. 38, No. 9, Sep. 1997.
Chang Bu Jeong et al., Comparison of Image Enhancement Methods for the Effective Diagnosis in Successive Whole-Body Bone Scans, Journal of Digital Imaging, vol. 24, No. 3 Jun. 2011, pp. 424-436.
Massimo Imbriaco et al., A New Parameter for Measuring Metastic Bone Involvement by Prostate Cancer: The Bone Scan Index, Clinical Cancer Research, 1998; 4:1765-1772.
M Noguchi et al, Percentage of the positive area of bone metastasis is an independent predictor of disease death in advanced prostate cancer, British Journal of Cancer, (2003) 88, 195-201.
J. Yahara et al., Quantitative evaluation of bone metastases in patients with advanced prostate cancer during systemic treatment, 2003 BJU International, 92, 379-384.
Michael Depa et al., Robust Atlas-Based Segmentation of Highly Variable Anatomy: Left Atrium Segmentation, Statistical Atlases and Computational Models of the Heart. (Lecture notes in computer science, v.6364) Springer.
Cheng-Yl Liu et al., Pictorial Multi-atlas Segmentation of Brain MRI, pp. 65-70.

\* cited by examiner

COMPUTER-AIDED BONE SCAN ASSESSMENT WITH AUTOMATED LESION DETECTION AND QUANTITATIVE ASSESSMENT OF BONE DISEASE BURDEN CHANGES

PRIORITY CLAIM

This application claims the benefit of U.S. Prov. Pat. App. No. 61/548,498 filed Oct. 18, 2011 and entitled COMPUTER-AIDED BONE SCAN ASSESSMENT WITH AUTOMATED LESION DETECTION AND QUANTITATIVE ASSESSMENT OF BONE DISEASE BURDEN CHANGES. This application claims the benefit of U.S. Prov. Pat. App. No. 61/714,318 filed Oct. 16, 2012 and entitled COMPUTER-AIDED BONE SCAN ASSESSMENT.

INCORPORATION BY REFERENCE

This application incorporates by reference in its entirety and for all purposes U.S. Prov. Pat. App. No. 61/548,498 filed Oct. 18, 2011 and U.S. Prov. Pat. App. No. 61/714,318 filed Oct. 16, 2012.

BACKGROUND OF THE INVENTION

1. Field of the Invention

The invention relates to the field of medical imaging. More particularly, the present invention relates to bone scans, bone lesions, and bone disease assessment.

2. Discussion of the Related Art

Bone tumors may originate in bone or they may originate in other sites and spread (metastasize) to the skeleton. For example, secondary tumors in the bone frequently result from metastasized prostate cancer. Images from bone scans reveal lesions associated with primary bone or metastatic cancer and their interpretations are used extensively in the diagnosis and treatment of the disease.

A few computer-aided lesion detection systems have been reported for bone scans. These techniques have included semi-automated image segmentation programs that are frequently too time-consuming for use in a clinical setting such as those of Erdi et al. and Yin et al. The semi-automated approach described by Erdi et al. requires that the user insert a seed point in each metastatic region on the image, a process that is nontrivial, considering that patients with bone metastases often have multiple disease sites.[1]

[1] Erdi Y E, Humm J L, Imbriaco M, Yeung H, Larson S M, Quantitative bone metastases analysis based on image segmentation. J Nucl Med 1997; 38:1401-1406. See also Yin T K, Chiu N T, A computer-aided diagnosis for locating abnormalities in bone scintigraphy by a fuzzy system with a three-step minimization approach. IEEE Trans Med Imaging 2004; 23:639-654.

More recently, a fully automated method developed by Sadik et al. combines bone lesion detection by image segmentation with scan evaluation through an artificial neural network to classify patients by their probability of bone metastasis, resulting in a binary grading of scans as having probable "bone metastases" or probable "no bone metastases."[2]

[2] See Sadik M, Jakobsson D, Olofsson F, Ohlsson M, Suurkula M, Edenbrandt L., A new computer-based decision-support system for the interpretation of bone scans. Nucl Med Commun 2006; 27:417-423.

Although this system showed a good correlation with physician-determined estimates of the probability of bone metastases, the system does not provide a quantitative metric for the comparison of consecutive scans nor a means of assessing treatment outcomes.

Importantly, none of the reported outcomes have been studied prospectively in relation to true measures of patient benefit such as reduction in skeletal-related events or prolongation of life, measures that form the basis for regulatory approvals.

Conversely, systems for image enhancement have been developed to normalize images from consecutive scans for ease of physician interpretation but have not attempted lesion identification.[3]

[3] Jeong C B, Kim K G, Kim T S, Kim S K, Comparison of image enhancement methods for the effective diagnosis in successive whole-body bone scans. J Digit Imaging 2011; 24:424-436.

Quantitative assessment by bone scintigraphy of metastatic bone disease burden in prostate cancer has been previously performed, including the development of metrics such as bone scan index (BSI) and percentage of the positive area on a bone scan (% PABS).[4]

[4] Imbriaco M, Larson S M, Yeung H W, Mawlawi O R, Erdi Y, Venkatraman E S, et al., A new parameter for measuring metastatic bone involvement by prostate cancer: the Bone Scan Index. Clin Cancer Res 1998; 4: 1765-1772. See also Noguchi M, Kikuchi H, Ishibashi M, Noda S., Percentage of the positive area of bone metastasis is an independent predictor of disease death in advanced prostate cancer. Br J Cancer 2003; 88:195-201.

Both BSI and % PABS have undergone initial evaluation as prognostic factors for patients with prostate cancer, but the methods used to calculate these metrics have been time-consuming, requiring extensive manual annotation of bone scans. Evaluation of % PABS and BSI as feasible metrics for the assessment of treatment response is ongoing.[5]

[5] Yahara J, Noguchi M, Noda S., Quantitative evaluation of bone metastases in patients with advanced prostate cancer during systemic treatment. BJU Int 2003; 92:379-384. See also Morris M J, Jia X, Larson S M, Kelly A, Mezheritzky I, Stephenson R D, et al., Post-treatment serial bone scan index (BSI) as an outcome measure predicting survival. Presented at: Genitourinary Cancers Symposium 2008;

While computer-aided detection (CAD) systems have been previously applied to bone scan analysis, they lack features in embodiments of the present invention. For example, such known systems have typically addressed lesion detection only on a single scan from a patient, without comparing successive scans.

SUMMARY OF THE INVENTION

A system and method that provides bone scan assessment with automated lesion detection and quantitative assessment of bone disease burden changes.

In various embodiments, the use of bone scans to monitor treatment effects utilizes accurate segmentation and quantification of lesions within a single scan, as well as the comparison of lesion measurements between consecutive scans. Embodiments provide an automated system that accurately and reproducibly segments and quantifies bone lesions to aid physicians in intrapatient and interpatient comparison.

The inventors have analytical validation of a bone scan computer-aided treatment assessment system that combines both automated lesion segmentation, including image normalization, and quantitative assessment of disease burden. Successful differentiation between untreated and treated patient groups was used to evaluate system capability for assessing treatment effects.

Validation shows the system is capable of reducing the variability of hand-annotated bone scan analysis, so that objective, reproducible, and quantitative measurements are consistently obtained which lays a foundation for prospective correlation of individual measures with other clinical and laboratory outcome data.

Validation shows the system is capable of accurate automated bone scan lesion segmentation (detection of lesion pixels) and capable of providing quantitative measures of lesion burden that may then be used to assess disease status changes in treated and untreated patients.

In various embodiments, the invention may be implemented as a computer program (software). The program may be executed by an image acquisition device, a reading workstation, a server, and/or other appropriate devices. Processing on a server may facilitate interfacing with a centralized imaging archive and storing bone scan analysis reports in a centralized database. The system may also be accessed remotely (e.g., via the Internet).

Embodiments of the invention may be described with reference to equations, algorithms, and/or flowchart illustrations of methods. These methods may be implemented using sets of instructions either separately, or as a component of a system. As such, each equation, algorithm, operation of a flowchart, and/or combinations thereof, may be implemented in various ways, such as hardware, firmware, and/or software. Computer program instructions may be loaded on to a computer, such that the computer program instructions provide a way to implement functions specified by the equations, algorithms, and/or flowcharts.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

Figure 1:
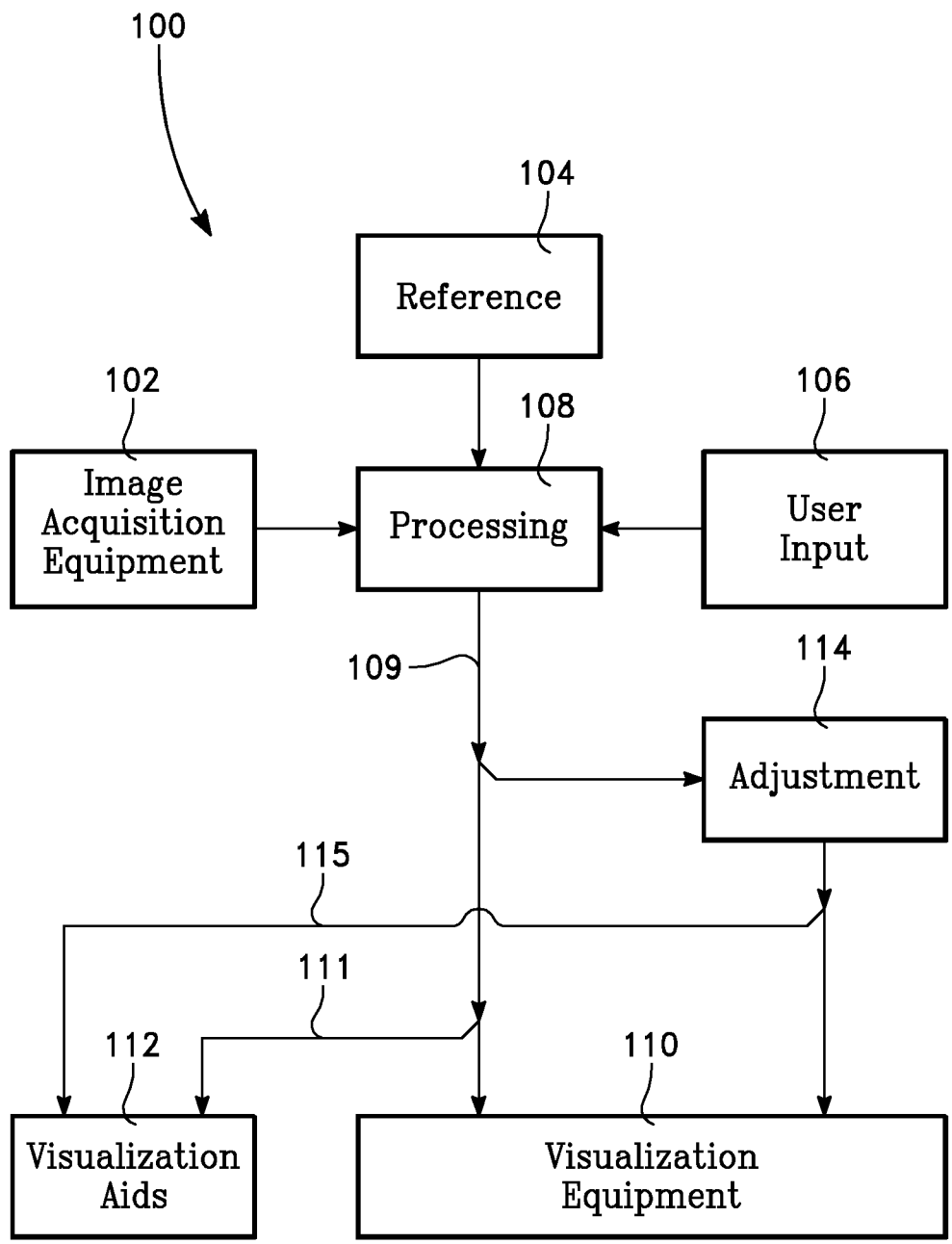
FIG. 1 shows a computer-aided quantitative bone scan assessment system in accordance with the present invention.

FIG. 1 shows a computer-aided quantitative bone scan assessment system in accordance with the present invention 100. A processing unit 108 receives image data from image acquisition equipment 102. Data from these and other images, processed or not, is available to the processor via a reference unit 104 for storing selected data. In various embodiments, processor inputs include user inputs and settings 106 such as those resulting from expert evaluation of any of patient condition, desired image quality, and equipment capability. In some embodiments, processing and/or user input is carried out, at least in part, in the image acquisition equipment.

Bone scan imaging equipment 102 includes any suitable bone imaging equipment commonly used in nuclear medicine. For example, in various embodiments imaging equipment utilizes radioisotopes and radiation sensitive cameras such as those used in scintigraphic imaging systems and devices. In particular, scintigraphy is a technique that uses radioisotopes in conjunction with a gamma camera for indicating tissues that accumulate the radioisotope. Here, gamma camera pixel intensity shows accumulated radioisotope and localized areas of high metabolic activity in bone, events indicative of a bone lesion.

Reference equipment 104 includes any suitable means for storing data and/or information about data. Typical reference units include digital data storage devices including semiconductor memory, moving media memory such as hard disc drives, optical memory, and like devices and equipment known in the computing field.

User input devices 106 include any suitable means for conveying a user's inputs to the processor 108. In various embodiments, any of a keyboard, mouse, touchscreen, and associated input processing means such as a personal computer are used.

In some embodiments, an adjustment unit or station 114 provides for enhancement and quality control of selected processor output data 109. While this function may be automated, using pattern recognition techniques for example, in various embodiments an expert such as a nuclear medicine radiologist with expertise in nuclear medicine enhances and/or corrects bone scan images/data. For example, false lesion indications resulting from pre-existing conditions such as joint disease and bone fracture are identified and resolved accordingly.

Bone scan processing 108 includes processing equipment, methods, and processes. Suitable equipment includes any suitable information processing equipment known in the computing field. In particular, digital processing equipment including any one or more microprocessors, personal computers, workstations, massively parallel computing infrastructure, and supercomputers provide, in various embodiments, suitable processing functionality.

Visualization equipment 110 includes any suitable equipment known in the computing field including displays and printers. Displays include CRT, LED, Plasma, Fluorescent, and electroluminescent display devices. Printers include devices fixing information in tangible media such as laser printers and devices with similar uses.

Graphic visualization aids 112 provide for visualizing physical structures and in particular for visualizing lesion indicating bone scan data. Visualization aids include the special case of compound images in the form of image sets presenting a foundational or base image that is overlain by an upper image. Translucent and/or transparent qualities of the upper image provide for simultaneous viewing of at least portions of the base image in conjunction with at least portions of the upper image.

As seen in the figure, a processor output 109 conveys information to one or more of visualization equipment 110, graphic visualization aids 112, and an adjustment unit 114. The visualization equipment and aids provide for visualization, in various embodiments, of one or both of unadjusted processor output 111 and adjusted processor output 115.

Figures below describe in more detail methods and processes carried out in the computer-aided quantitative bone scan assessment system 100 including methods and processes carried out in processing 108.

Figure 2:
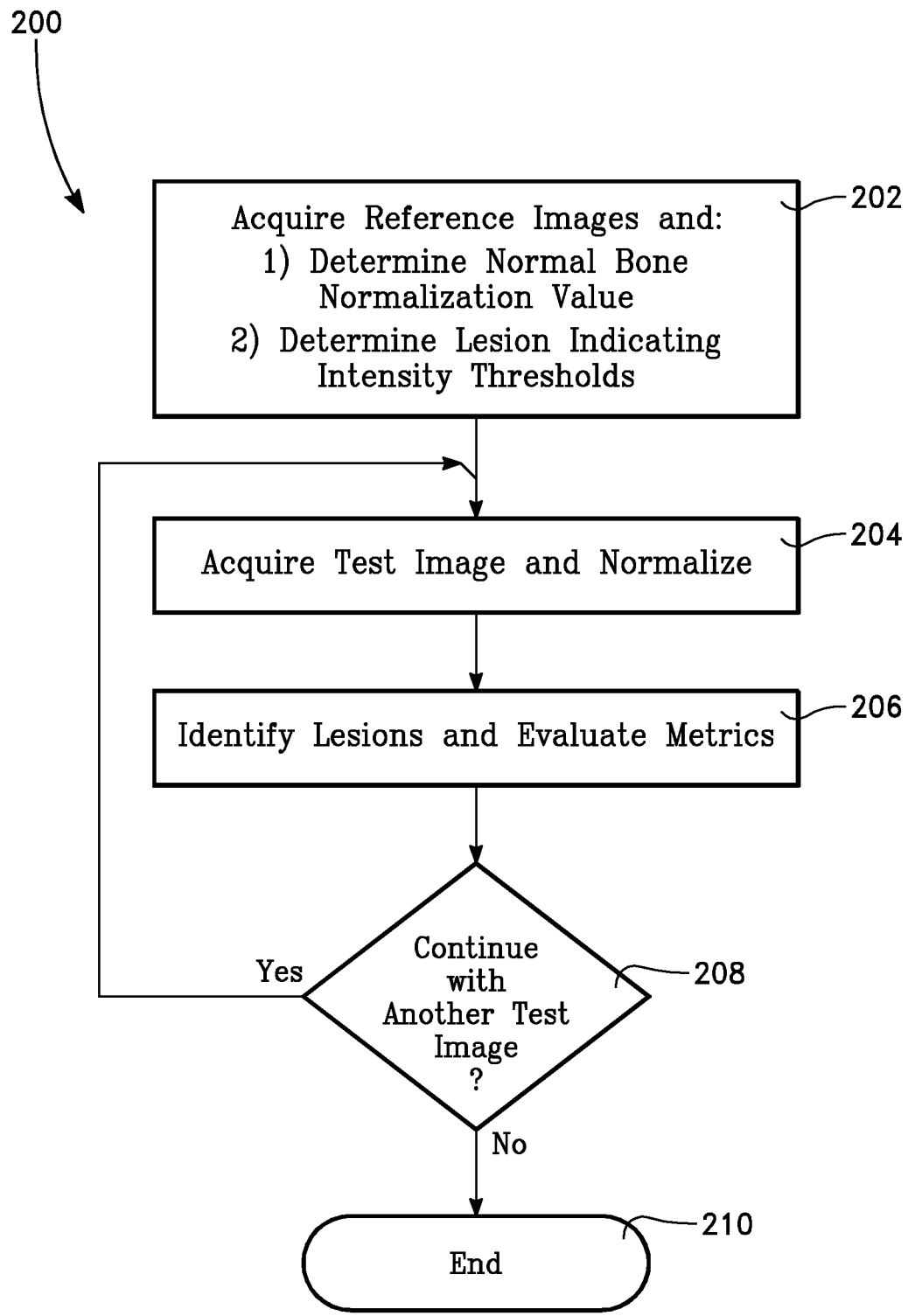
FIG. 2 shows an overview of a computer-aided bone scan assessment process in accordance with the present invention.

FIG. 2 shows an overview of a computer-aided bone scan assessment process in accordance with the present invention 200. An initializing step 202 enables a normalized test image step 204 and an evaluation of the test image including identifying lesions and generating quantitative metrics 206. As shown, subsequent test image evaluations do not typically require that the initialization step be repeated.

In the initializing step 202, one or more reference images are acquired. Typically, plural reference images are acquired from plural patients with positive indications of indication of primary or metastatic cancer to the bone. Selecting a group of reference images from a varied patient population tends to enhance the likelihood that reference norms will indicate, rather than fail to indicate, bone lesions in later compared test images.

Initialization step 202 includes determining a normalizing factor indicative of normal bone intensity. Intensity here refers to visible light intensity such as the intensity of a pixel in an image acquired by a gamma camera. Initialization also includes use of the reference images to determine intensity thresholds that are indicative of bone lesions. In various embodiments, the normalizing factor and intensity thresholds determined from the initialization step are stored for future use. In some embodiments, the values are stored in the reference unit 104.

Having completed the initialization step, normalizing 204 and evaluating 206 steps follow. In the normalizing step, a test image (e.g., data representing an image) is acquired by the image acquisition equipment 102 or otherwise and the image is normalized as further described below.

Normalization 204 prepares the test image for evaluation including lesion identification and metric generation 206. In various embodiments, normalization reduces the effects of variances in intensity due to differences in body habitus, radiotracer dosing levels and/or time between tracer administration and scan acquisition in order to improve reproducibility of lesion segmentation and quantitation. After intensity normalization, the pixel intensities of normal bone are consistent between time points enabling reproducible lesion segmentation and quantitative assessment in serial patient images.

The metrics from the evaluating step 206 provide a quantitative measure of lesion burden. As shown in decision step 208, additional test images may be normalized and evaluated without repeating the initialization step 202. After all test images are processed, an end step 210 is reached.

In an embodiment, multiple test images are made and processed for one particular patient. Each test image provides a quantitative measure of the patient's lesion burden such that test images made at different times provide patient health monitoring including whether the disease is responding to treatment, stable, or progressing.

Figure 3:
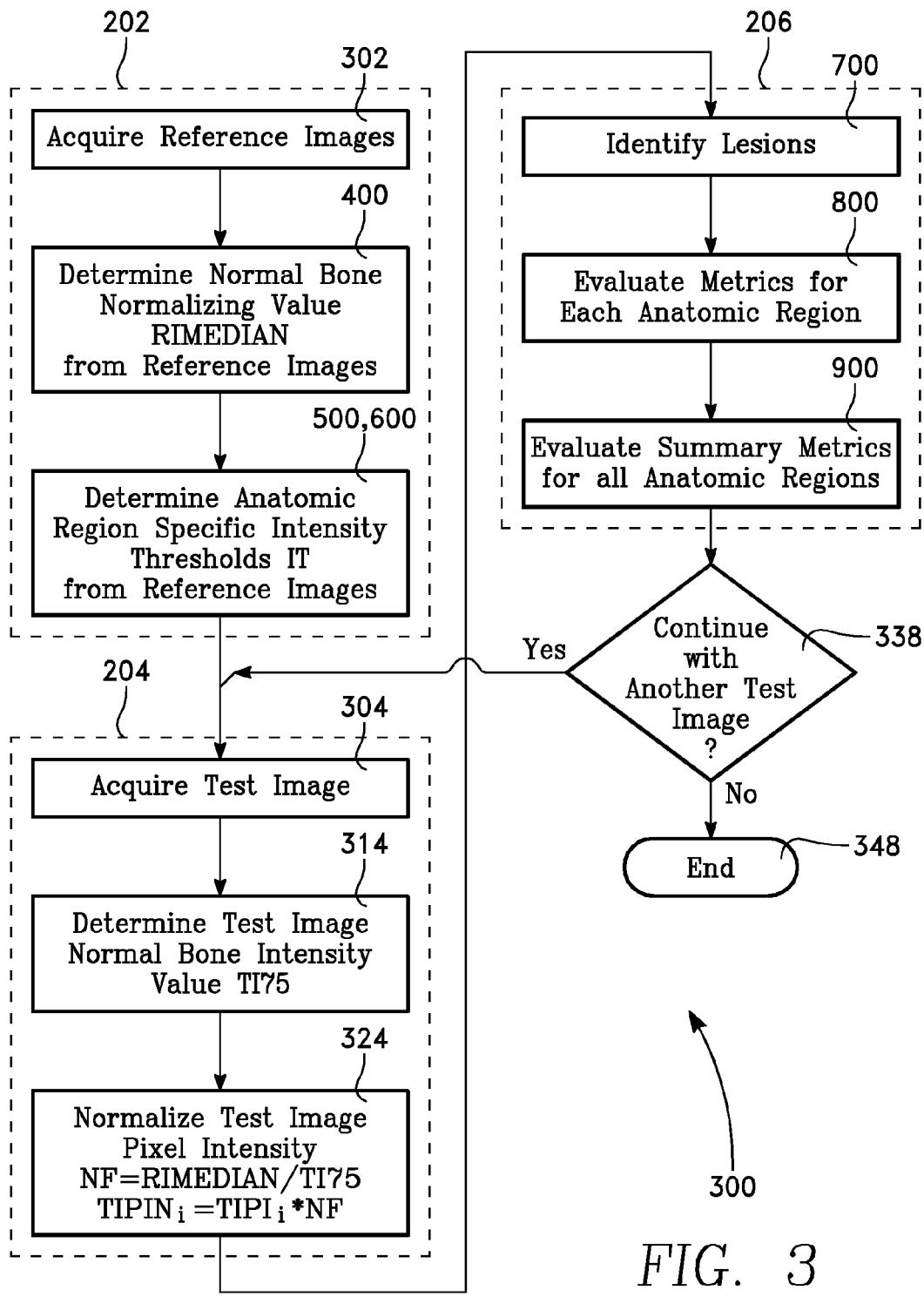
FIG. 3 shows a more detailed overview of the assessment process of FIG. 2.

FIG. 3 shows a more detailed overview of an embodiment of the computer-aided bone scan assessment of the present invention 300. As before, an initializing step 202 is followed by a normalizing step 204, and an evaluation step 206.

The initializing step 202 includes acquisition of reference image(s) 302, use of the reference images to determine a normalizing value ("RIMEDIAN") for normal bone 400, and use of the reference images to determine anatomic region specific intensity thresholds ("$IT_r$") 500, 600. As mentioned above, it is typical for plural reference images to be acquired 302 from plural bone cancer patients.

The normalizing step 204 includes acquisition of a test image 304, determination of a test image normal bone intensity value ("TI75") 314, and normalizing test image pixel intensity 324.

From test image normal bone intensity TI75 and the reference image normalizing value RIMEDIAN, a normalizing factor NF is calculated as shown in Equation 1.

Normalizing Factor: NF=(RIMEDIAN/TI75)    Equation 1,

The normalizing factor NF is used to normalize the intensity of pixels in the test image. Where $TIPI_i$ is test image pixel intensity for a particular pixel and $TIPIN_i$ is the normalized test image pixel intensity for that pixel, test image pixels are normalized as shown in Equation 2.

$TIPIN_i=TIP_i \times NF$    Equation 2:

Following this normalization, normal bone intensities in the reference images correspond with normal bone intensities in the test image.

Normalization 204 prepares the test image for evaluation 206. The evaluation step includes indication of lesions 700, evaluation of anatomic region specific metrics 800, and evaluation of summary metrics for all anatomic regions 900, each of which is further described below.

The metrics provides a quantitative measure of lesion burden. As shown in decision step 338, additional test images may be normalized and evaluated without repeating the initialization step 202. After all test images are processed, an end step 348 is reached.

Figure 4:
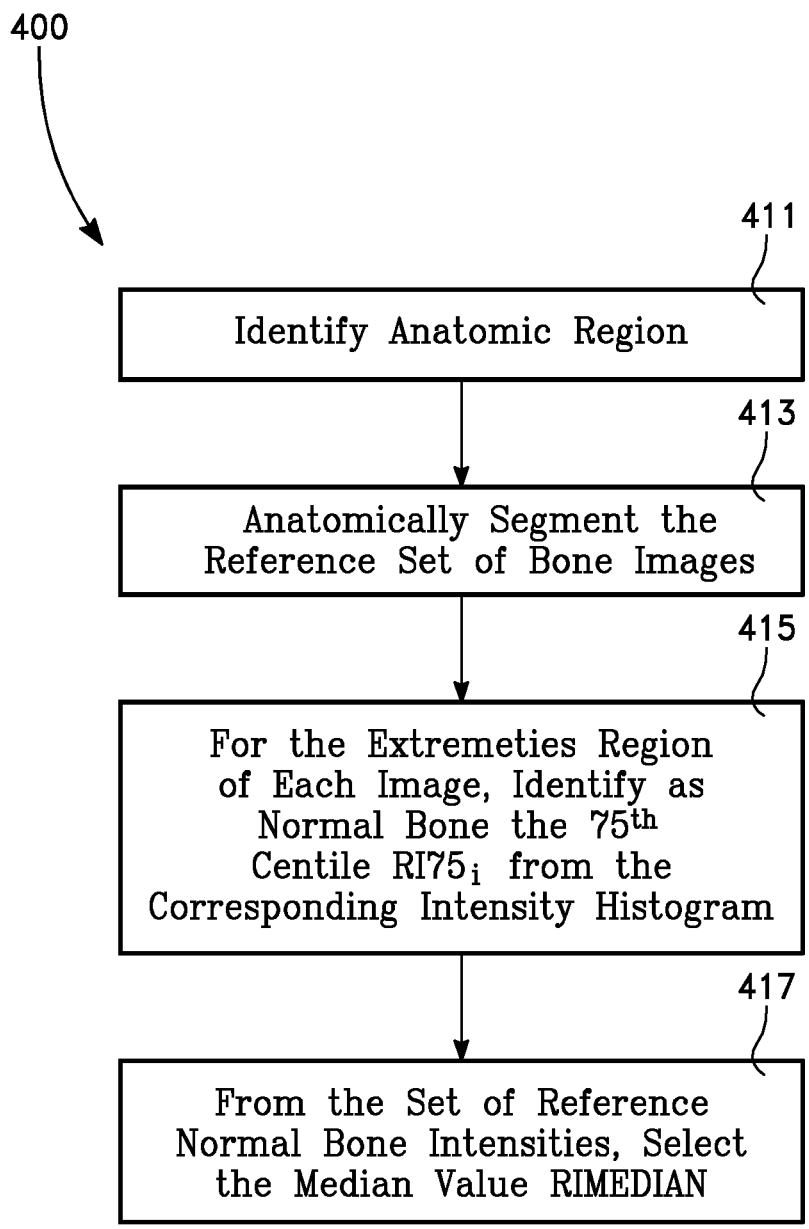
FIG. 4 shows a method of calculating a normal bone normalizing value RIMEDIAN from reference images in accordance with the process of FIG. 2.

FIG. 4 shows a method of calculating a normal bone normalizing value RIMEDIAN from reference images 400. Anatomic regions are identified 411, the set of reference bone images are anatomically segmented 413, a normal bone intensity value is identified in each image 415, and a reference bone intensity value representative of all of the reference images is determined 417.

In step 411, anatomic regions are identified. These regions generally represent skeletal regions. In an embodiment, the anatomic segmentation identifies anatomic regions by comparison to an atlas image with the following anatomic labels: spine, ribs, head, extremities, and pelvis.

In step 413, the set of reference bone images are anatomically segmented. Segmentation here corresponds with the anatomic regions identified above.

In step 415, a normal bone intensity value is identified in each reference image. In various embodiments, a statistically valued intensity is selected in a particular region of each reference image to represent normal bone intensity. The statistical valuation used may be based on experience, evaluated based on a trial and error procedure or determined in another manner known to persons of ordinary skill in the art.

In an exemplary case based on the inventor's experience, normal bone intensity is indicated by the $75^{th}$ centile value $RI75_x$ ($1 \leq x \leq$ no. of regions) of the intensity histogram of a particular anatomical region. In an embodiment, normal bone intensity in a reference image is determined by the $75^{th}$ centile value RI75x selected from the extremities region intensity histogram.

In step 417, a reference bone intensity value representative of all of the reference images is determined. In various embodiments, this representative bone intensity value is the median value RIMEDIAN corresponding to the set of 75th centile values $RI75_x$ mentioned above.

Figure 5:
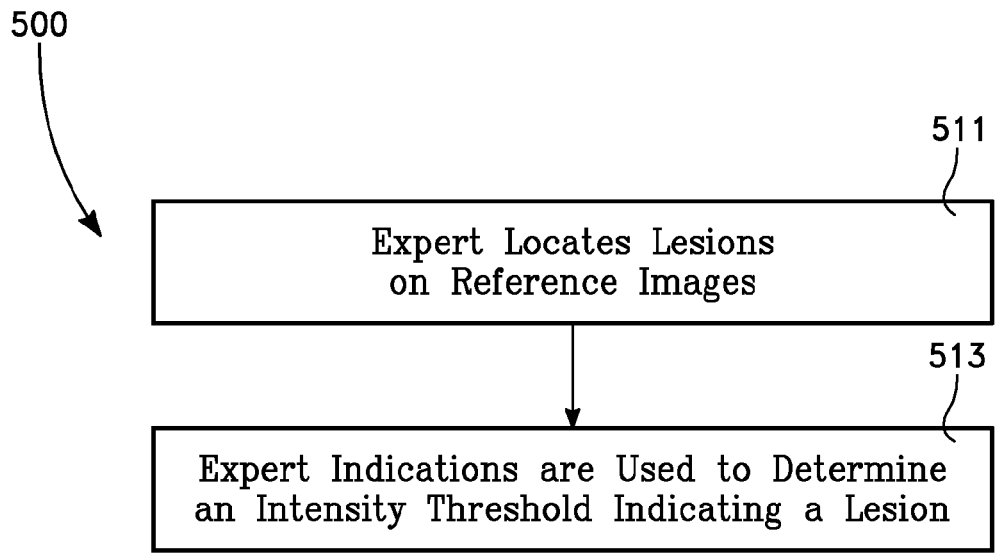
FIG. 5 shows a methodology including use of an expert and identification of lesion indicating intensity thresholds.
Figure 6:
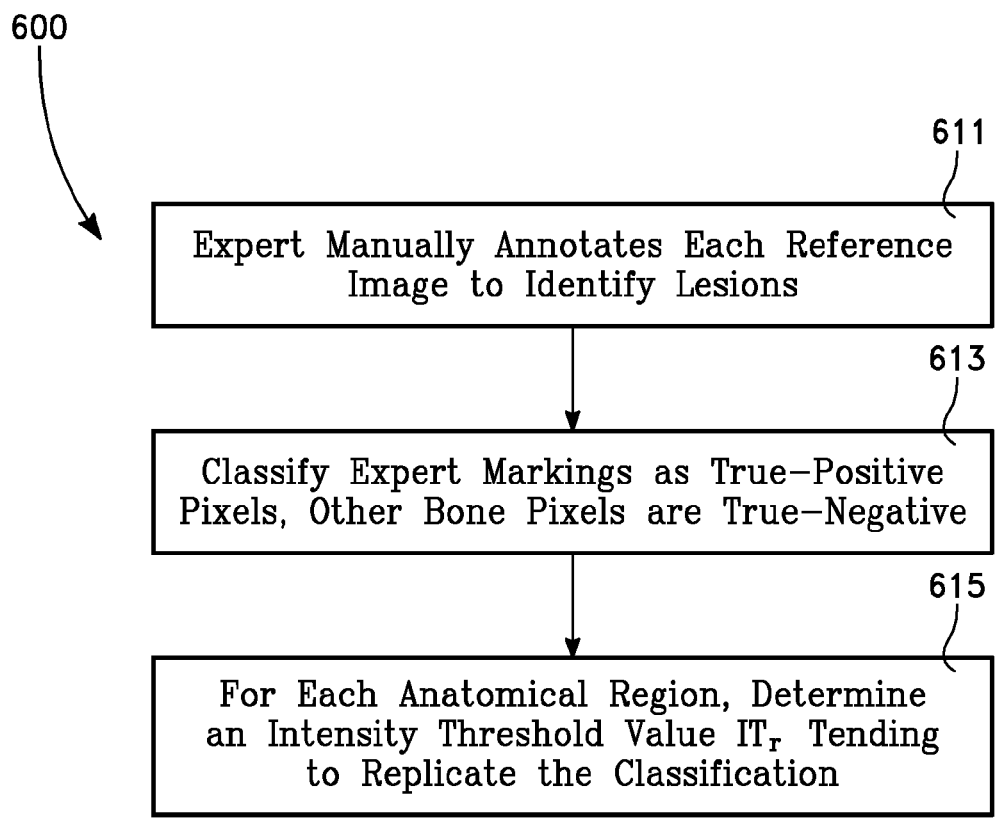
FIG. 6 shows a second methodology including use of an expert and identification of lesion indicating intensity thresholds in accordance with the process of FIG. 2.

FIGS. 5 and 6 show methodologies for determining anatomically specific intensity thresholds from the reference images 500, 600. FIG. 5 shows a methodology including use of an expert and identification of lesion indicating intensity thresholds 500. A first step 511 provides an expert such as an expert in reading nuclear medicine images and in particular bone scan images of patients with bone lesions. In this step, the expert locates lesions on the reference images. In a second step 513, the expert indications are evaluated. This evaluation determines the intensity threshold(s) that indicate a lesion.

FIG. 6 shows a second methodology including use of an expert and identification of lesion indicating intensity thresholds 600. Steps include annotation 611, classification 613, and determining intensity threshold values $IT_r$.

Annotation 611 utilizes an expert such as the expert mentioned above. Here, the expert annotates each reference image to indicate lesions. Classification 613 classifies the expert markings to associate pixels with lesions. In an embodiment, a binary classifier system is used such that expert markings indicating lesions are classified as true-positive pixels and other bone pixels are classified as true-negative pixels.

Intensity threshold determination 615 determines, for each anatomical region, a single intensity threshold $IT_r$ tending to replicate the classification for all patients in the reference group.

For example, for each anatomical region an intensity threshold value is found that tends, for all patients in the group, to maximize the number of true positives (increased mean sensitivity) while minimizing the number of false positives (increased mean specificity).

In various embodiments, lesion segmentation via anatomic region-specific intensity thresholding is performed on a normalized image to detect lesions in each anatomic region by applying a specific threshold to the normalized image, then performing connected component filtering.

And, in various embodiments, a receiver operating characteristic curve (ROC or ROC Curve) is used to evaluate the performance of the above binary classifier system. The curve/criteria is created by plotting the fraction of true positives out of the positives (TPR=true positive rate) versus the fraction of false positives out of the negatives (FPR=false positive rate), at various threshold settings. TPR is also known as sensitivity, and FPR is one minus the specificity or true negative rate.

The discrimination threshold, here Intensity Threshold ($IT_r$), is varied to determine an $IT_r$ value that tends to optimize both mean sensitivity and mean specificity. For example, an ROC Curve plotting true positive lesion pixels as a function of false positive lesion pixels will typically have a distinctive change of slope indicating an optimum $IT_r$ value.

Figure 7:
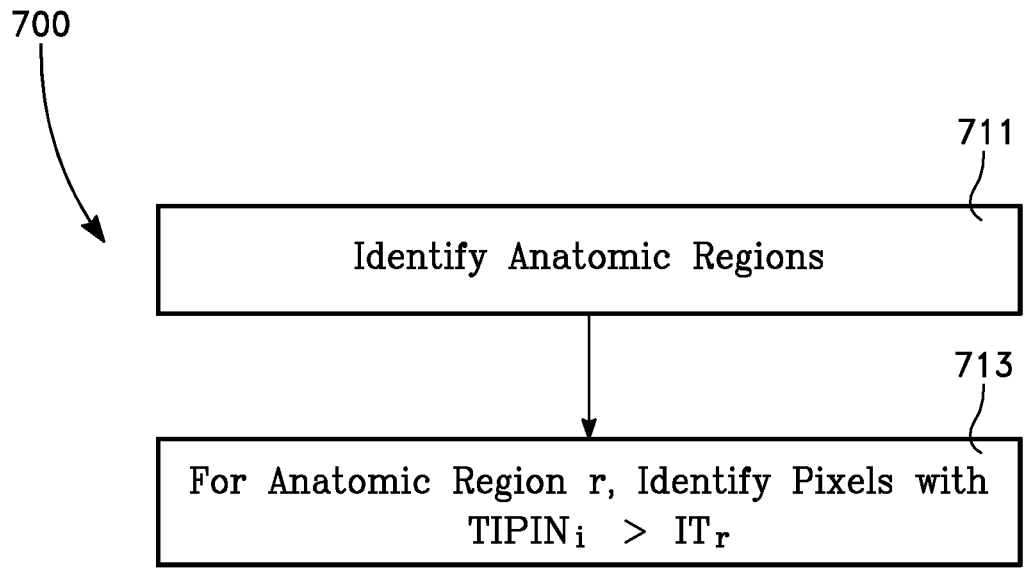
FIG. 7 shows identification of true-positive pixels indicating a lesion in accordance with the process of FIG. 2.

FIG. 7 shows identification of true-positive pixels indicating a lesion 700. As mentioned above, anatomic regions are identified 711. Matching pixel intensities in each test image anatomic region with a corresponding intensity thresholds IT, the following test 713 is performed $$\text{Indication Of Lesions: TIPIN}_{r,i} > IT_r \qquad \text{Equation 5,}$$

As seen, this equation compares the normalized test image pixel intensities in a particular anatomical region with the reference image derived anatomically specific Intensity Threshold, $IT_r$. Where the test image pixel intensity is greater than the corresponding Intensity Threshold, the pixel is a true-positive pixel indicating the presence of a lesion.

Figure 8:
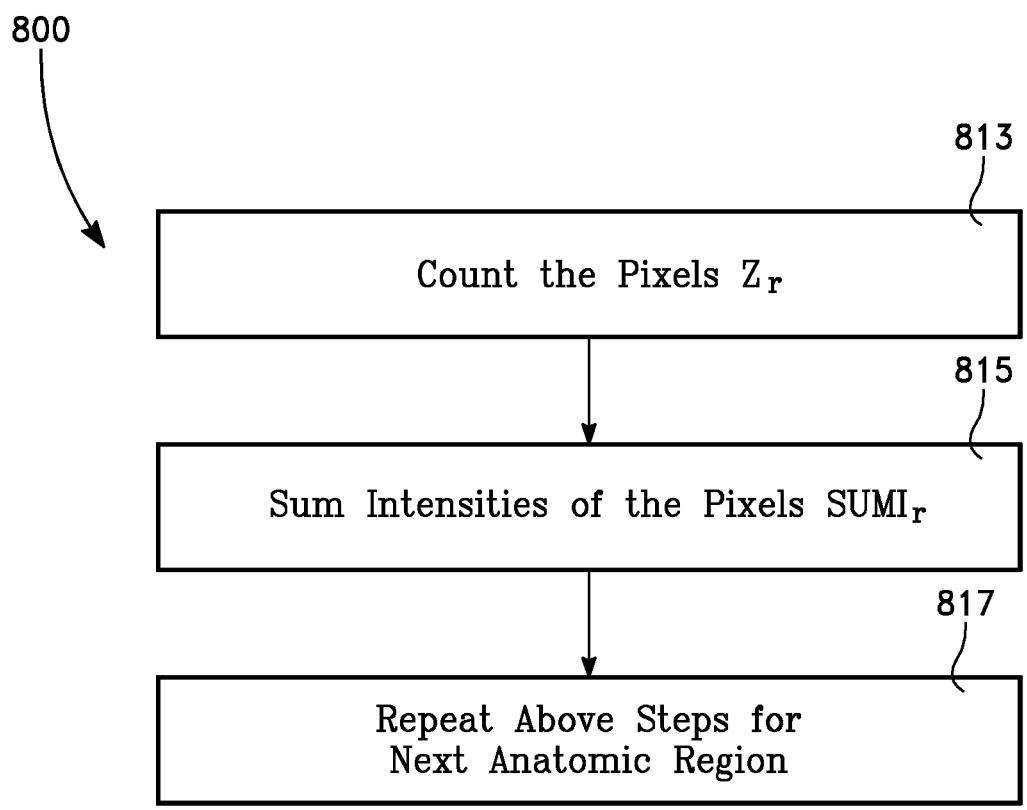
FIG. 8 shows evaluation of anatomically specific metrics in accordance with the process of FIG. 2.

FIG. 8 shows evaluation of anatomically specific metrics 800. In particular, for each anatomic region the number of true-positive pixels, $Z_r$, is counted 813. In addition, the intensities of all of the true-positive pixels are summed, $SUMI_r$, in a subsequent step 815. These steps are repeated for each of the anatomic regions 817.

Figure 9:
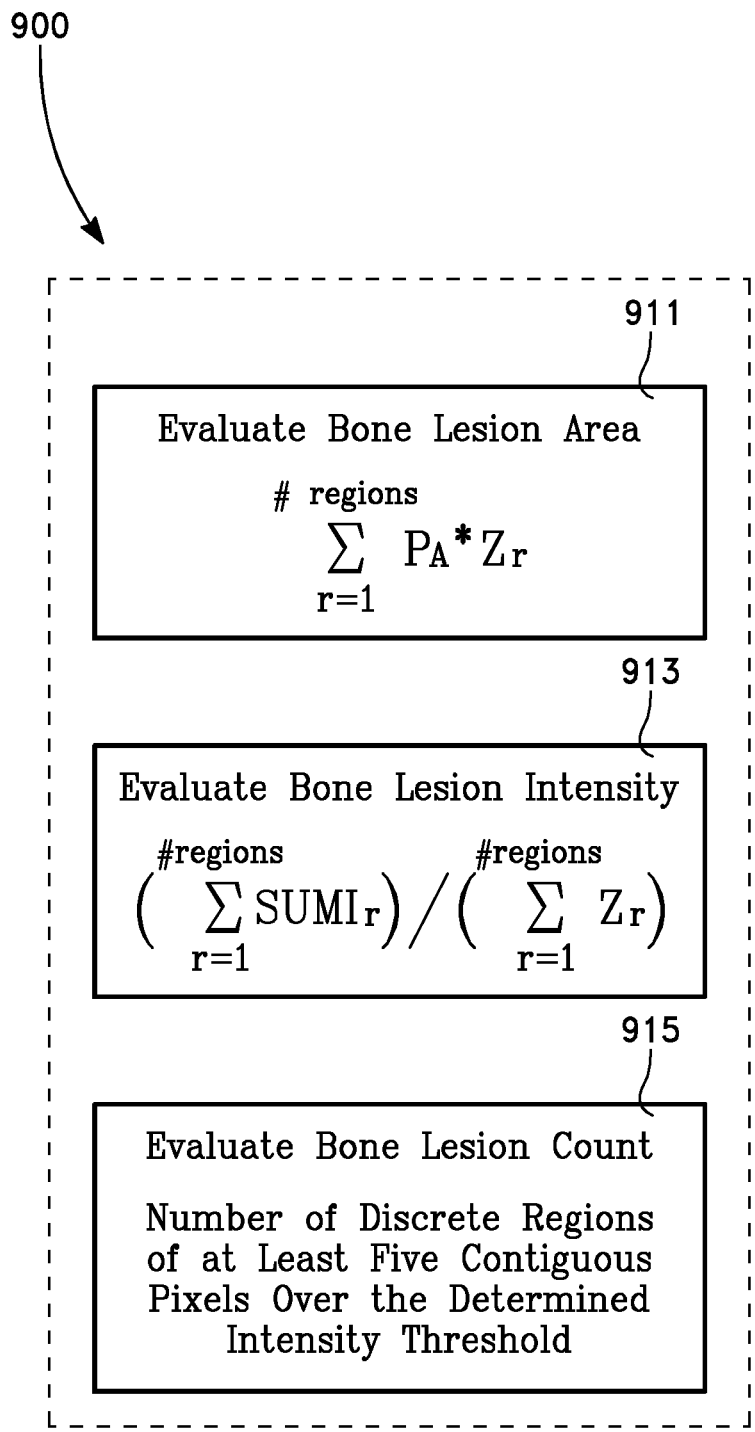
FIG. 9 shows evaluation of summary metrics for all anatomic regions in accordance with the process of FIG. 2.

FIG. 9 shows evaluation of summary metrics 900. Summary metrics include for all anatomic regions.

Summary bone lesion area 911 is evaluated as shown in Equation 6 where $P_A$ represents the area of one pixel.

$$\text{Summary Bone Scan Lesion Area }(BSLA): \sum_{r=1}^{\#regions} P_A * Z_r, \qquad \text{Equation 6}$$

Summary bone lesion intensity 913 is evaluated as shown in Equation 7 below.

$$\text{Summary Bone Scan Lesion Intensity }(SBLI): \qquad \text{Equation 7}$$

$$\left( \sum_{r=1}^{\#regions} SUMI_r \right) / \left( \sum_{r=1}^{\#regions} Z_r \right),$$

Summary bone lesion area thus represents a quantification of the size and number of active regions on the bone scan whereas the bone scan lesion intensity represents the level of bone formation activity.

In various embodiments, bone lesion count 915 is assessed. In an embodiment utilizing a lesion area identifier, lesions are identified as discrete regions including at least five contiguous pixels, each of which is over the determined intensity threshold. Lesion identifiers and the size of contiguous pixel groups in various embodiments consider not only features large enough to be of interest, but also whether there is a likelihood a group of the size selected will be simultaneously affected by common failures such as faulty scanner camera pixels.

Summary Bone Scab Lesion Count (BSLC): Number of discrete regions of at least five contiguous pixels over the determined intensity threshold.  Equation 8, Changes in the lesion burden metrics between serial bone scans from a given patient may be calculated during response assessment in order to quantitatively assess the patient's response to treatment. The percent change in a lesion burden metric may be used to assess treatment progression and/or response, with cut points in the percent change delineating each response category. For instance, a bone scan image lesion area increase of 30% or greater may be considered progression, and a decrease of 30% or greater may be considered response.

In operation, steps in above described assessments may be varied to suit availability of images, data derived from images, and reference image processing steps. For example, determining anatomic region specific intensity thresholds from reference images might follow normalization of test images. In another example, multiple sets of reference images may be processed and corresponding RIMEDIAN and $TI_r$ values used with one or more test images. As such, persons of ordinary skill in the art will recognize from the present disclosure that sequences of image processing steps differing from those described above are appropriate in cases, for example the case where there is a search for an optimum set of reference images. Therefore, operation of the above described system may be varied to suit particular needs and constraints.

Figure 10:
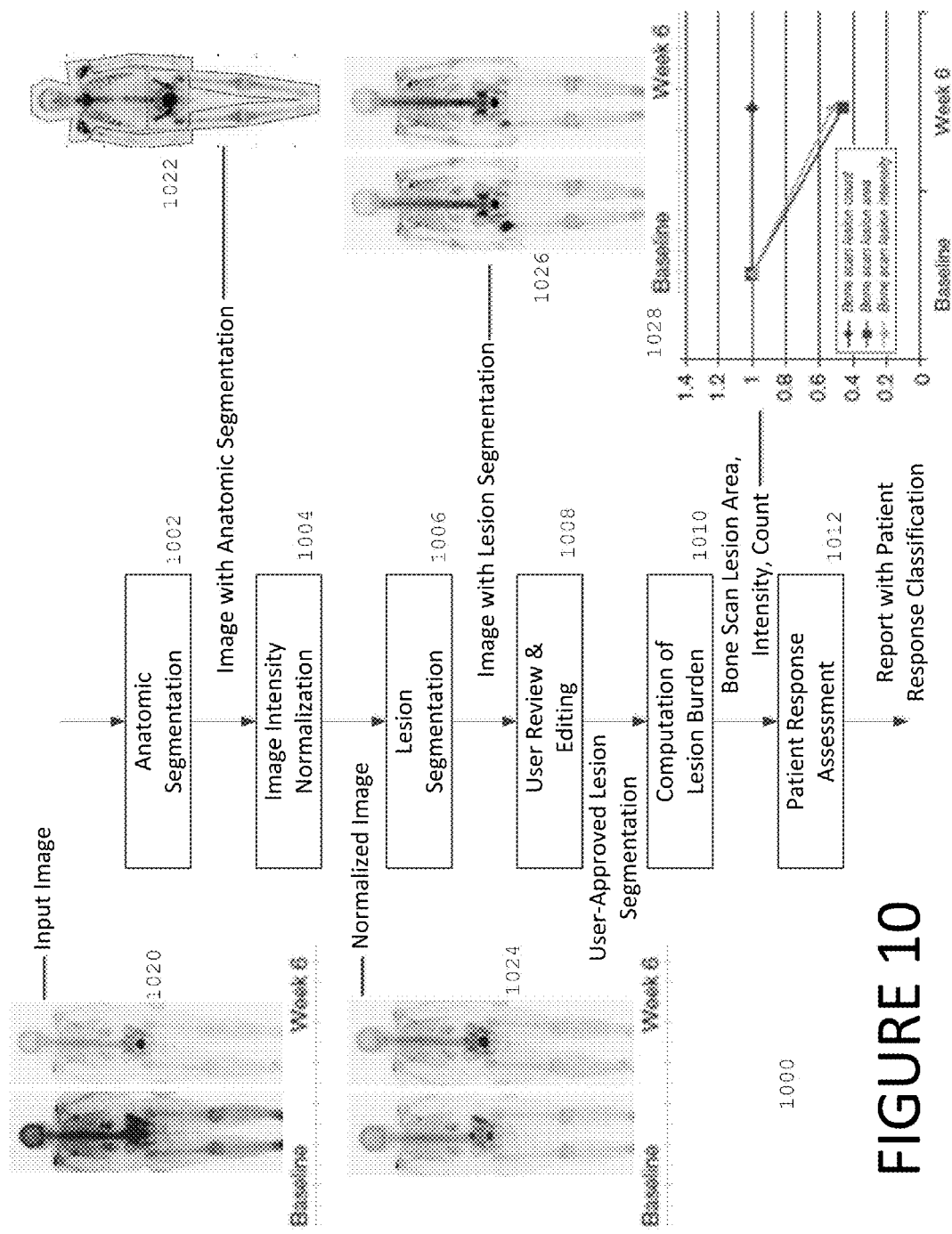
FIG. 10 shows an exemplary assessment system operating scenario in accordance with the process of FIG. 2.

FIG. 10 illustrates an exemplary assessment system operating scenario 1000. Generally, input image(s) are processed using data from reference image(s) to produce a quantitative assessment of bone disease burden. To the extent there are patient images at treatment intervals, changes in quantitative indicia of the disease are indicative of a response to the treatment, a progressing disease, or a stable disease.

As shown, patient baseline and week 6 images are available 1020. The assessment process provides the quantitative disease indicia for the baseline and for the week 6 images in generally the same manner.

Initially, anatomic segmentation is performed to segment an input image 1002. During image segmentation, the image is divided into anatomic regions. Anatomic regions selected for this example are spine, ribs, head, extremities, and pelvis. Anatomic segmentation of the input image provides a segmented image similar to the illustrated segmented image 1022.

Image intensity normalization is performed on the segmented input image 1004. Normalization produces images similar to the illustrative normalized baseline and week 6 images 1024.

Lesion segmentation or identification 1006 follows image normalization 1004. Here, intensity normalized pixels in each region of the input image are compared with intensity threshold values derived from corresponding regions of reference images as explained above. The region specific intensity threshold values derived from the reference images are indicative of lesions in the input image.

Optional user review and editing to obtain user-approved lesion segmentation 1008 and adjustments 114 shown in FIG. 1 provide for human adjustments to be made to the assessment. For example, false positives due to joint disease and broken bones can be resolved here. Lesion segmentation with or without the optional user review and editing produces images similar to the illustrative baseline and week 6 lesion indicating images 1026.

Computation of lesion burden 1010 follows lesion segmentation 1006 and user review and editing 1008, if any. During this step, measures of lesion area, lesion intensity, and lesion count for specific regions and/or all regions are determined. In an embodiment, lesion area is summed for all regions and lesion intensity is summed for all regions. In various embodiments, lesion count, for example lesion count summed for all regions, together with summary values of lesion area and lesion intensity, provide means to quantify lesion burden.

In various embodiments, patient response assessment 1012 includes a patient response classification report showing for example, response or progression or stable. In an embodiment, a chart 1028 provides a quantitative comparison of baseline and week 6 measures for bone scan lesion count, bone scan lesion area, and bone scan lesion intensity.

In some embodiments, image comparisons utilize a foundation image together with a semi-transparent overlay. In an embodiment, an automatically segmented region image is presented, colorized or not, as a semi-transparent overlay on the bone scan image (original or normalized). Such may be used, inter alia, as an operator aid in adjusting and/or editing an image as needed 114.

In an embodiment, a foundation image, such as a baseline image with lesion segmentation 1026, together with a semi-transparent overlay of the week 6 (or a similar image from another treatment interval) image is used. Here, colors or colorization may be used to enhance the visual contrast between the "before and after" conditions. Notably, these image comparisons provide what some would see as qualitative, "at a glance" information. To the extent care is taken in preserving the detail in the original images, they also embody a quantitative measure of bone disease burden change.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An automated method for processing a subject bone scan image and quantifying bone lesion burden, the method comprising the steps of:
   providing a subject bone scan image formed from pixels;
   performing atlas-based anatomic segmentation of the image in order to identify a set of anatomic regions included on the image;
   normalizing the intensity of the image such that normal bone in the image has an intensity that corresponds with that of normal bone in one or more reference bone scan images;
   detecting bone lesions in each region of the image by comparing the intensities of pixels in the region with a region specific intensity threshold derived from the one or more reference bone scan images; and,
   quantifying bone lesion burden using characteristics of a set of pixels corresponding to detected bone lesions.

2. The automated method of claim 1 further comprising the steps of:
   from the processed subject bone scan image, determining at least one quantitative bone lesion burden indicium from the group lesion area, lesion intensity, and lesion count;
   from a previously processed bone scan image, determining the corresponding quantitative bone lesion burden indicium; and,
   determining patient response based on a comparison of the quantitative bone lesion burden indicia.

3. The automated method of claim 2 wherein the quantitative bone lesion burden indicium is cumulative for all of the regions.

4. The automated method of claim 2 further comprising the steps of:
   from plural reference scans, determining a reference scan normal bone normalizing value that is not region specific;
   from the subject bone scan image, determining a subject bone scan image normal bone intensity value; and,
   carrying out the normalizing step using the reference scan normal bone normalizing value and the subject bone scan image normal bone intensity value.

5. The automated method of claim 4 further comprising the steps of:
   annotating plural reference scans to indicate lesions;
   classifying annotations as true-positive pixels or otherwise as true-negative pixels; and,
   for each anatomical region determining an intensity threshold value tending to replicate the classification.

6. The method of claim 2 wherein shape filtering methods are not used.

7. The method of claim 2 wherein quantifying bone lesion burden does not include estimating bone lesion volume.

8. The automated method of claim 1 further comprising the steps of:
for the subject bone scan image, determining at least two quantitative bone lesion burden indicia from the group lesion area, lesion intensity, and lesion count;
for a previously processed bone scan image, determining the corresponding quantitative bone lesion burden indicia; and,
determining patient response based on a comparison of the quantitative bone lesion burden indicia for the subject bone scan image and the corresponding quantitative bone lesion burden indicia for the previously processed bone scan image.

9. The automated method of claim 1 further comprising the steps of:
for the subject bone scan image, determining quantitative bone lesion burden indicia lesion area, lesion intensity, and lesion count;
for a previously processed bone scan image, determining the corresponding quantitative bone lesion burden indicia; and,
determining patient response based on a comparison of the quantitative bone lesion burden indicia for the subject bone scan image and the corresponding quantitative bone lesion burden indicia for the previously processed bone scan image.

10. The automated method of claim 1 further comprising the step of:
selecting as a foundation image a patient baseline image that is normalized and processed to show lesions;
selecting as a semi-transparent overlay image a patient later in time image that is normalized and processed to show lesions; and,
presenting the superimposed images to a lay-person as a means for explaining how the lesion burden of a particular patient has changed.

11. The automated method of claim 1 further comprising the step of:
selecting as a foundation image one of a patient original image or patient normalized image;
selecting as an overlay image a semi-transparent overlay of detected lesions; and,
presenting the superimposed images as a means for visualizing the extent and distribution of lesion burden of a particular patient.

12. The automated method of claim 11 wherein the overlay image is an image that is contemporaneous with the foundation image.

13. The method of claim 1 wherein the normalizing means and the detecting means are not interdependent.

14. The method of claim 1 wherein the normalizing means and the detecting means are not dependent upon knowledge of possibly diseased regions of the skeleton.

15. The method of claim 1 further comprising:
a reference intensity level for normalizing "RIN";
the RIN used to process multiple subject bone scan images that resulted from corresponding temporally spaced scans of a particular patient; and,
the unchanging RIN providing a consistent normalizing baseline that enables determination of patient response.

16. The method of claim 1 further comprising the steps of:
from the processed subject bone scan image, determining a first bone lesion burden from lesion intensity;
from a previously processed bone scan image, determining a second bone lesion burden from lesion intensity; and,
determining patient response based on a comparison of the first and second bone lesion burdens.

17. The method of claim 1 further comprising the steps of:
from the processed subject bone scan image, determining a first bone lesion burden from lesion area;
from a previously processed bone scan image, determining a second bone lesion burden from lesion area; and,
determining patient response based on a comparison of the first and second bone lesion burdens.

18. The method of claim 1 wherein the normal bone in one or more reference bone scan images is extremities bone and excludes bone of the spine, rib, head, and pelvis.

19. The method of claim 18 wherein normal bone is identified as the seventy-fifth centile from a corresponding intensity histogram.

20. An automated method for processing a subject bone scan image and quantifying bone lesion burden, the method comprising the steps of:
scanning a bony anatomical structure with a scanner to produce a subject bone scan image formed by pixels having intensities indicating rates of bone metabolism;
using an anatomical atlas, anatomically segmenting the subject image into regions;
normalizing the intensities of subject image pixels using a normal bone indicium from a set of reference bone scan images and a normal bone indicium from the subject image;
detecting a number of lesion pixels, if any, in the subject image using subject image pixel intensity and reference image derived intensity thresholds that are region specific; and,
from characteristics of the lesion pixels, if any, quantifying bone lesion burden.

21. The automated method of claim 20 further comprising the steps of:
for the subject image, determining a subject image bone scan lesion area as the number of lesion pixels in all of the regions multiplied by pixel area;
for a previously processed bone scan image, determining a corresponding quantitative bone lesion burden indicium; and,
determining patient response based on a comparison of the subject image bone scan lesion area and the corresponding quantitative bone lesion burden indicium.

22. The automated method of claim 21 further comprising the steps of:
for the subject image, determining summed intensities as a sum of the intensities of the lesion pixels in all of the regions;
for the subject image, determining summed lesion pixels as a sum of the lesion pixels in all of the regions;
determining a bone scan lesion intensity as the summed intensities divided by the summed lesion pixels;
for a previously processed bone scan image, determining a corresponding quantitative bone lesion burden indicium; and,
determining patient response based on a comparison of the bone scan lesion intensity and the corresponding quantitative bone lesion burden indicium.

23. The automated method of claim 20 further comprising the steps of:
selecting a number k of contiguous pixels unlikely to be simultaneously affected by common failures such as a faulty scanner camera pixels;
for the subject image and considering all regions, determining the number of groups j having k or more lesion pixels; and,
setting bone scan lesion count equal to j.

24. The method of claim 23 wherein k is not used to determine quantitative bone lesion burden.

25. A device for processing a subject bone scan image and quantifying bone lesion burden, the device comprising:
- a radiotracer type scanner, a processor, and digital data memory;
- an anatomic atlas stored in memory;
- from reference scans
  - a normal bone indicium is derived and stored in memory and
  - a set of lesion indicating intensity thresholds that are region specific is derived and stored in memory;
- the scanner operable to acquire a subject bone scan image formed from pixels;
- the processor operable to use the anatomic atlas to anatomically segment the subject image;
- the processor operable to use the normal bone indicium to normalize the intensities of pixels in the subject image;
- the processor operable use the intensity thresholds to detect lesion pixels; and,
- the processor operable to calculate quantitative lesion burden metrics from lesion pixel characteristics.

26. A method for processing bone scan images and quantifying bone lesion burden of a particular patient, the method comprising the steps of:
- from a set of reference images, determining a normalizing constant from the intensities of normal bone in the image;
- from the set of reference images, determining for each of multiple atlas based regions a corresponding bone lesion intensity threshold;
- for a patient first image, processing the image using the normalizing constant and the set of bone lesion intensity thresholds;
- for a patient second image made at least weeks after the first image, processing the image using the normalizing constant and the set of bone lesion intensity thresholds; and,
- indicating patient response by comparing a bone lesion burden corresponding with the first image and a bone lesion burden corresponding with the second image.

* * * * *